United States Patent [19]
Veldkamp et al.

[11] Patent Number: 5,773,074
[45] Date of Patent: Jun. 30, 1998

[54] METHOD FOR THE PRODUCTION OF FOODSTUFF USING SOLUBLE CASEIN COMPOUNDS OR CASEINATES AND THE PRODUCT THEREOF

[75] Inventors: Jeroen Jacobus Cornelius Veldkamp, Den Dungen; John William Broekhuis, Hilversum; Harm Jacob Wichers, Driebergen, all of Netherlands

[73] Assignee: Hak B.V., Giessen, Netherlands

[21] Appl. No.: 702,576

[22] PCT Filed: Mar. 2, 1995

[86] PCT No.: PCT/NL95/00078

§ 371 Date: Oct. 8, 1996

§ 102(e) Date: Oct. 8, 1996

[87] PCT Pub. No.: WO95/23516

PCT Pub. Date: Sep. 8, 1995

[30] Foreign Application Priority Data

Mar. 2, 1994 [NL] Netherlands ............................ 9400320

[51] Int. Cl.⁶ .......................................................... A23B 7/00
[52] U.S. Cl. ........................... 426/615; 426/629; 426/634
[58] Field of Search ..................................... 426/629, 634, 426/615

[56] References Cited

U.S. PATENT DOCUMENTS

| 4,011,348 | 3/1977 | Farrier et al. | 426/615 |
| 4,143,167 | 3/1979 | Blanchaud et al. | 426/615 |
| 5,019,403 | 5/1991 | Krochta . | |

FOREIGN PATENT DOCUMENTS

| 0 191 311 | 8/1986 | European Pat. Off. . |
| 58-081735 | 5/1983 | Japan . |

*Primary Examiner*—Helen Pratt
*Attorney, Agent, or Firm*—Young & Thompson

[57] ABSTRACT

The invention relates to a method for the production of an optionally preserved, water- and/or oil-containing foodstuff such as vegetables, pulses and fruit, which a casein compound which is soluble in water and/or oil or has been dissolved in water and/or oil is added to the foodstuff before, during or after the preparation or sterilisation, a closed container, containing a foodstuff which has been prepared according to this method, as well as the use of a casein compound which is soluble in water, or has been dissolved in water, to improve the appearance of optionally preserved water- and/or oil-containing products.

8 Claims, No Drawings

METHOD FOR THE PRODUCTION OF FOODSTUFF USING SOLUBLE CASEIN COMPOUNDS OR CASEINATES AND THE PRODUCT THEREOF

The invention relates to a method for the production of an optionally preserved foodstuff, such as vegetables, pulses and fruit.

When dried and soaked, and also freshly prepared, pulses, such as kidney beans, capers, dark red kidney beans, lentils and all other conceivable dark-coloured dry pulses, are preserved, a visually very unattractive black discolouration of the product, i.e. pulses and brine or syrup occurs after some time, starting from the top. A discolouration of this type is particularly undesirable if the preserved foodstuffs are in chromium- or tin-plated, coated, steel or aluminum cans, foil packaging or glass jars. (The liquid part of the can or jar contents is termed "brine" if it is salt and "syrup" if it contains sugar. The corresponding German term is "Aufguss"). Black discolouration occurs only if product (=pulses) is protruding above the liquid and thus comes into contact with atmospheric oxygen, which is present in very small amounts at the "top". Usually, a jar will be filled with beans and brine or syrup in such a way that the level of the liquid is always higher than the fill level for the beans. In a well filled jar of this type, the liquid frequently gives rise to black discolouration; the beans themselves do so to a much lesser degree. The discolouration is assumed to be the result of complex formation between iron(III) ions and water-soluble tannins (polyphenols) from the seed coat of the pulses in the presence of oxygen. Because the anthocyans are water-soluble, they are therefore capable of diffusing from the seed coat of the pulse to the top of the jar. After this, together with the $Fe^{3+}$ ions, produced by oxidation of the $Fe^{2+}$ ions by the air present in said top area, a black compound is produced with the complexed polyphenols. Up to now, discolouration has been effectively prevented by adding ethylenediaminetetraacetic acid (EDTA) in the form of the calcium disodium salt (E 385) to the brine or syrup. EDTA is also used to prevent black discolouration in pulses which have been filled into chromium- or tin-plated, coated, steel or aluminum cans. If EDTA is not used, the consumer is confronted, on opening the packaging, with an undesired and unappetising layer, which looks like engine oil, on top of the product.

However, from the standpoint of food technology, there are objections to the addition of EDTA. In the digestive tract and in the blood, EDTA can impede the absorption of all sorts of divalent cations (iron and calcium) which are very beneficial for the body. Calcium and EDTA constitute a problem because of the reduced or restricted absorption of calcium during build-up of the bones in growing children and of decalcification of the bones of the elderly. Iron constitutes a problem for the same reason in infants (build-up of the blood) and the sick (increased risk of anemia). It is for these reasons that attempts have long been made to find replacements for EDTA in preserved foodstuffs, for example pulses in glass containers. This research has been directed at, for example, complexing agents, such as dipyridyl, citric acid, ascorbic acid, polyphosphate and pyrophosphate. However, satisfactory results have not been achieved. Up to now, EDTA appeared to be irreplaceable.

Surprisingly, it has been found that in optionally preserved, water-containing foodstuffs and many other products, EDTA can be replaced by surprisingly small amounts of casein compounds with good results.

The invention therefore relates to a method for the production of an optionally preserved foodstuff containing oil or water (which contains additives such as salt, aroma substances and flavourings, vinegar, binders, etc.), such as vegetables, pulses and fruit and/or any conceivable mixture of the abovementioned products, wherein a casein compound which is soluble in water and/or oil or has been dissolved in a water-in-oil emulsion or in water and/or oil is added to the foodstuff before, during or after the preparation or sterilisation in which the casein compound is used in an amount of at most 20 g per 1000 g foodstuff including water and/or oil containing brine or syrup. In addition to sterilisation/pasteurisation (=preservation by the action of heat), preparation must also be taken to include soaking and blanching. The addition of caseinate to soaking and/or blanching water must also be seen as one of the possibilities for preventing black discolouration or reducing leaching.

European patent application 0 191 311 discloses a process for treating fruit and vegetables, particularly in such a way that formation of a red discolouration during the heat treatment does not take place. It is stated that the process is applicable for vegetables and fruit containing considerable amounts of leuco antho-cyanidines, for examples bananas, pears, apples, cabbage, cauliflower, and white onions. "Beans" are also mentioned, i.e. beans such as butter or string beans. Pulses are not mentioned. The invention of EP-A-0 191 311 provides a solution for red or pink discolouration, which is mainly a problem with bananas and pears. The solution for the problem of the red discolouration formed during the heating of fruit, was the addition of a protein. This protein may be of animal or vegetable origin. Preferred amounts for caseinate of 3 to 7 wt. % are mentioned. However, it is indicated in a comparative example that by using 2 g calcium caseinate in 100 g of banana's mash apart from sterilisation an undesired discolouring takes place. Consequently, a prejudice existed against the use of 2 wt. % or less of caseinate.

The casein compounds used are preferably sodium caseinate, potassium caseinate, calcium caseinate or magnesium caseinate, but especially potassium caseinate because of its good solubility in water and the fact that it can be used in low-sodium products. Moreover, the use of potassium caseinate has a highly beneficial sub-sidiary effect, namely a very much clearer, less turbid, brine or syrup when used for pulses. The fact that potassium caseinate gives a clearer brine or syrup than does calcium caseinate can be explained by the fact that calcium can give rise to the formation of sparingly soluble salts ($CaCl_2$ and $CaCO_3$) which cause turbidity. Incidentally, it has been found that in certain products, for example dried soaked capers, sodium caseinate has a better effect on the clarity of the brine or liquid than does potassium caseinate. As a supplementary remark, it can be pointed out that a positive aspect of calcium caseinate and all other calcium salts is that they have the effect of strengthening the seed coat.

Incidentally, it has been found that proteins other than casein compounds have no effect when used in heat-preserved pulses High-whip powdered albumen, pH 5.0 and 7.0

Non-whip powdered albumen, pH 7.0 and 9.5

Desalinated whey protein powder skimmed milk powder, spray-dried full fat milk powder, spray-dried dairy ice cream powder.

That is to say, these proteins can be used in non-heat-preserved products.

With the method according to the invention, the amount of casein compound to be used will be dependent on the nature of the foodstuff. In general, however, about 0.01–150 g, preferably about 0.1–10 g, of casein compound per liter of water and/or oil will be used, the water or oil being the so-called brine or syrup. Brine or syrup is understood to be the water or oil including additives which are added to the foodstuff. Applications are conceivable in which oil is used in place of water as the brine or syrup. In these cases it is better first to introduce the caseinate into an oil-in-water emulsion. Caseinate has a powerful emulsifying effect.

The amount of casein compound to be used depends on the amount of tannins which have to be bound. Even a minimal concentration of tannins can give rise to problems. An amount of casein compound of only 0.01 g/l water and/or oil (brine or syrup) will already be able to give a beneficial effect.

Generally the brine or syrup is about ⅓ of the total weight of the foodstuff. For example: glass jars containing dried soaked capers or dark red kidney beans having a total content of about 360 grams contain 120 grams brine or syrup and 240 grams of pulses. It may be assumed that the brine or syrup often forms 20–40% of the total weight contents of the jars with preserved foodstuffs such as vegetables, fruit and pulses.

As has already been stated the amount of casein compound as used according to the invention is dependent upon the specific foodstuff. The possible amounts according to the invention may be summarized as follows:

| | gram of casein compound per | |
|---|---|---|
| | liter brine or syrup | kg of foodstuff including optional brine or syrup |
| amounts accoding to the invention | | |
| maximum | 60 | 20 |
| generally | 0.1–50 | 0.01–16 |
| preferably | 0.1–25 | 0.8–8 |
| more preferably | 1–10 | 0.3–3 |

If according to the invention more than the maximum amount (i.e. more than 20 g/1000 g of "gross" product) is used, a white scale (or sediment), white skins (or flakes), turbidity, gelation, or dark (brown) coloured film occurs in the product.

When the process according to the invention was used, it appeared that ascorbic acid (vitamin C) and/or buffers of ascorbic acid and ascorbate has/have a beneficial effect on the action of the caseinate in respect of the prevention of discolouration reactions. The use of ascorbic acid/ascorbate buffers enables the acidity (pH) of the brine or syrup to be made more readily adjustable. As a result the flocculation of caseinate, which is pH-dependent and has an adverse effect, can be more easily controlled or even completely prevented. The amount of ascorbic acid and/or ascorbate can be, for example, between 0.01 and 10 g/l, preferably between 0.25 and 3.5 g/l.

Furthermore, it can be advantageous to use other reducing agents, such as sulphurous acid and the salts thereof and the following (organic) acids (which bind divalently or polyvalently charged metal ions): adipic acid, DL-malic acid, succinic acid, citric acid, acetic acid, fumaric acid, D-glucuronic acid, L-lactic acid, L-tartaric acid, phosphoric acid and galacturonic acid, mixtures thereof and low-molecular polymerised compounds which have the above-mentioned acids as base components and in which free carboxyl groups remain on the chain after polymerisation.

These other reducing agents and organic acids are preferably used in the same amounts as ascorbic acid/ascorbate.

It is pointed out that, in addition to its role in binding iron, caseinate also has a very important, inexplicable, subsidiary function with respect to:

1 Reducing the frequently adverse turbidity as a result of gelling of (natural) starch, originating from the pulses and liberated during heating thereof, in the brine or syrup:

2 Prevention or reduction of leaching (which results in the colour of the pulses fading) of the seed coat colorant into the brine or syrup. Seed coat colorants are coloured anthocyans or tannins.

3 Prevention of starch turbidity in varieties of vegetables and fruit which do not naturally contain polyphenols, by the addition of, for example, mono- and di- forms of polyphenols.

The pH can also play a role during the addition of the casein compound. A desired colour, and/or a clear brine/syrup, for the pre-served foodstuff is obtained if the pH is between 3.5 and 7.0 during use of the caseinate compound and between 4.5 and 6.5, preferably between 5 and 6, during addition of the casein compound.

The invention relates both to preserved and to fresh foodstuffs with which dis-colouration reactions occur as a result of (enzymatic) oxidation of polyphenols. In particular, however, it is often preserved foodstuffs which are concerned.

The method according to the invention is suitable for improving or stabilising the product appearance, that is to say improving the chemical/physical product stability of many types of foodstuffs, amongst which the following examples may be mentioned:

Dried and soaked pulses
Freshly processed pulses
  Broad beans, flageolets
  Young capers
  Peas in the pod/garden peas
  Lentils, chickpeas
  Maize, French beans, butter beans
White vegetables which develop a (pink) discolouration, such as chicory, leeks, cauliflower, asparagus, salsify
Vegetables which develop a (brown) discolouration, such as celeriac, swedes, winter radishes, (cocktail) onions, mushrooms, fennel, kohlrabi, artichokes
Fruit which develops a (brown) discolouration, such as apples, pears, bananas
Vegetables which develop a (black) discolouration, such as potatoes.

In general, the invention is applicable to all varieties of vegetables and fruit and all conceivable mixtures thereof, for example mixtures of pulses with various vegetables, where the colour is adversely affected by the action of the enzyme polyphenoloxidase (PPO).

In the case of pulses which have dark-coloured seed coat poly-phenols, black discolouration occurs, for example in kidney beans, broad beans which turn brown on boiling, lentils, kidney beans, young capers and capers and said discolouration can be combated according to the invention. In the case of green-, yellow- or white- coloured dry or fresh pulses, vegetables and fruit, such as haricot beans, giant (haricot) beans, and all other conceivable varieties, starch turbidity can be prevented or reduced by adding proteins and/or adding polyphenols according to the invention.

Polyphenols is the generic term for compounds which contain benzene rings having one or more OH groups. The word "poly" relates to the OH groups and not to the number of rings, although there can be more than one ring. A differentiation is made between two separate groups of polyphenols, i.e:
1. aromatic oxy-acids
2. flavanoids:
   which are further to be differentiated into the sub-groups:
   a. flavanonenes
   b. flavones and flavanonenes
   c. flavanols:
      1. catechol or flavan-3-ols
      2. leuco-cyanidines or flavan-3,4-diols
   d. Anthocyani(di)nes
      1. glucose form
      2. A-glycon form Dissolution of the casein compound, in particular caseinate, is preferably effected with the use of high shear forces, in particular with the use of a solid/liquid mixer having a powerful dispersing action. A so-called jet mixer, for example, can be used for this purpose. A mixer of this type is generally known. Caseinate has to be dispersed well=finely distributed throughout the liquid phase, before it goes into solution. Jet mixers produce a high rate of flow and consequently a great deal of turbulence. This turbulence has an excellent dispersing effect. After the caseinate has been dispersed, dissolution will no longer present any problem. If dispersion is poor, a sealing film will form around the caseinate particle as a consequence of the reaction with water. Said film will make further dissolution of the caseinate more difficult and/or will delay said dissolution. Incidentally, the addition of salts and/or sugars to the liquid phase improves the dispersing effect.

The use of oils as anti-foams is also possible. The action of oil as an anti-foam is based on lowering of the surface tension at the interface between foaming medium and air. In general, proteins, for example case mate, can give rise to foaming. Excessive foaming occurs in the case of very intensive mixing of air and protein solutions. Intensive mixing, for example using a jet mixer, is necessary in connection with the production of a homogeneous caseinate solution. Occlusion of air during this process is undesirable but always occurs to a greater or lesser extent. In order to prevent or to control foaming, an edible vegetable or animal oil or fat, for example rape oil, which is a conventional additive in the dairy industry, can be added during or after the preparation of the caseinate solution. Raising the temperature of the liquid phase raises the rate of dissolution and the maximum concentration of caseinate compounds in the solution. The dispersing effect of the aqueous fraction is increased by preparing an oil-in-water emulsion.

The invention also relates to containers, in particular closed glass containers, but also chromium-plated or tinplated, coated steel or aluminum cans and/or foil packaging, filled with optionally preserved foodstuffs prepared in accordance with the method described above, in which method a casein compound is used.

It is self-evident that the invention also relates to the use of a casein compound which is soluble in water or has been dissolved in water, in particular the caseinate defined above, to improve the appearance and/or brine or syrup of optionally preserved water-and/or oil-containing products especially vegetables, fruit and pulses, in which a casein compound is used in an amount of maximum 20 g per 1000 g of foodstuff including water and/or oil containing brine or syrup.

General description of the method of preparation of preserved vegetables and fruit:

1. Pretreatment:
   For example peeling, cutting, topping and tailing (French beans);
   Purpose: rendering vegetables and fruit ready to eat
2. Blanching:
   For example introducing vegetables and fruit into water or steam for a short time and then cooling rapidly:
   Purpose: varies from product to product, but frequently:
   e.g. reduction of microbiological contamination
      making the product packable: reducing the volume of leaf vegetables
      removal of air from vegetables and fruit
      deactivation of enzymes, so that undesired reactions are inhibited/prevented
3. Packing:
   For example in glass, cans, aluminum or foil pack Purpose: provision of barrier characteristics, so that adverse influences (specifically rotting) from the outside are limited.
4. Addition of brine or syrup:
   For example in the form of water or oil with supplementary additives
   Purpose: varies from product to product, but frequently:
   e.g. improvement of heat transfer
      improvement of product characteristics
      protection of vegetables and fruit against over-heating, burning-on and the like.
5. (Vacuum) sealing:
   For example provision of a lid or edge seal
   Purpose: provision of barrier characteristics, so that adverse influences (specifically rotting) from the outside are limited.
6. Preservation:
   e.g. by heating: pasteurisation
      sterilisation
   by cooling: cooling, deep-freezing
   by removal of
      moisture: freeze-drying, hot air drying
   Purpose: prolonging the restricted shelf life of perishable products (vegetables and fruit).

Specific process description for dried Dulses

1. Pretreatment: Soaking of pulses supplied in dry form for 8–20 hrs
2. Blanching: Briefly heating for 5–15 minutes in water at 80–95° C.
3. Packing: Filling, depending on the pack size, of the desired amount of soaked and blanched pulses into glass jars or cans
4. Addition of brine or syrup: Addition of a limited amount of water and/or oil in which sugar, salt, ascorbic acid and caseinate have been dissolved
5. (Vacuum) sealing: Fitting of a lid under vacuum and steam injection for glass jar or can
6. Preservation: Heating the sealed jar or can containing pulses and brine or syrup for 20–30 minutes under a steam pressure of 1.7 to 2.5 bar, at temperatures of 120–125 ° C. and then cooling rapidly to ambient temperature (sterilisation).

In this way the said compounds can be used—as replacements for the EDTA or calcium disodium EDTA used to date—as, for example, an additive (stabiliser) in emulsified sauces such as mayonnaise, shellfish and crustaceans in frozen form or in cans or glass jars and, of course, the abovementioned products.

The invention is explained in more detail in the following examples.

EXAMPLE 1

ADDITION OF CASEINATE TO THE BRINE OR SYRUP FOR DARK RED KIDNEY BEANS (drkb)

1.0 Introduction.

To date, the brine or syrup for drkb has been turbid and darkcoloured.

The experiment is to determine whether an improvement in respect of a clear brine or syrup is obtained with and without caseinate.

2.0 Materials.

Chippewa Valley Brand Beans.

K caseinate from DMV international (Campina).

3.0 Method.

Soaking, blanching and sterilisation in accordance with the usual methods.

3.1 Jar composition

| | |
|---|---|
| Fill weight: | 180–220 gram. |
| Brine or syrup weight: | 145–185 gram. |
| Nett weight: | 365 gram. |

3.2 Brine or syrup composition

The following series are added to the beans:

| | |
|---|---|
| *standard (1): | salt |
| | sugar |
| | 1.0 gram ascorbic acid |
| | 0.6 gram citric acid |
| *brine/syrup (2): | salt |
| | sugar |
| | 1.0 gram ascorbic acid |
| | 5.0 grams K caseinate |
| *brine/syrup (3): | salt |
| | sugar |
| | 5.0 gram K caseinate |

3.3 Dissolution of K caseinate.

In order to dissolve the caseinate well, it first has to be finely dispersed. A mixing beaker is used for this purpose, small pieces of caseinate being added carefully to an amount of water under intensive stirring, creating a vortex. Optimum dissolution temperature in water of 40–50 ° C.

3.4 Organaleptic inspection

4.0 RESULTS 4.1 Soaking and blanching results

The soaking and blanching results are given in the table below.

| | Soaking for 6–12 hours in tap water | | |
|---|---|---|---|
| beans | dry (gram) | soaked (gram) | blanched (gram) |
| drkb | 3250 | 5574 (= 65%) | 6157 (= 89%) |

The results of soaking and blanching (gram and %) are given in Table 4.1.

4.2 Lab determinations before and after sterilisation 4.2.1 pH measurements of the brine/syrup in the table below

| Brine/syrup | pH |
|---|---|
| 1 (standard) | 3.33 |
| 2 | 5.14 |
| 3 | 6.88 |

The pH of the brine/syrup before sterilisation is shown in Table 4.2.1.

4.2.2 Visual assessment of the brine/syrup after sterilisation shown in table.

| Brine/syrup Cold soaking | Assessment |
|---|---|
| 1 (standard) | turbidity settling out |
| 2 | clear, some caseinate flocks |
| 3 | clear and dark |

The visual assessment of the brine/syrup is given in Table 4.2.2

4.3 Lab measurements after sterilisation given in the table below.

| Soaking for 6–12 hours in tap water | Refraction Brix | pH |
|---|---|---|
| 1 (standard) | 8.1 | 6.17 |
| 2 | 9.0 | 6.30 |
| 3 | 9.1 | 6.47 |

Lab determinations after sterilisation are given in Table 4.3.

4.4 Results of the inspection

The aspects to be considered in the inspection were the visual assessment in the jar, consistency and taste. The results are given in the table below.

Only the beans soaked cold were inspected during the inspection.

| Cold soaking of drkb | Assessment in jar | Consistency | Taste |
|---|---|---|---|
| Brine/syrup 1 (standard) | 5.5 | too hard | 7.0 |
| Brine/syrup 2 | 7.4 | reasonable/good | 7.2 |
| Brine/syrup 3 | 7.2 | reasonable/good | 7.3 |

The results of the inspection are given in Table 4.4.

4.4.1 Remarks with regard to the inspection

The inspectors were unanimously of the opinion that the addition of caseinate to the drkb brine/syrup results in a clear optimisation of 14 the appearance of the end product.

Most inspectors preferred the sample containing 1 gram ascorbic acid in the brine/syrup. This sample has a clear, light brine/syrup, in contrast to samples 3 and 4 (clear, dark brine/syrup)

EXAMPLE 2

1.0 INTRODUCTION.

A number of series were made containing decreasing amounts of ascorbic acid and a constant amount of caseinate. In addition, tests were carried out using a decreasing amount of caseinate alongside a constant amount of ascorbic acid.

The aim was to establish whether an ideal combination becomes apparent here.

When preparing a brine/syrup, the ascorbic acid is dissolved in, for example, 750 ml of water and the caseinate is dissolved in the remaining 250 ml. The caseinate solution is then poured into the ascorbic acid solution.

2.0 MATERIALS

Chippewa Valley Brand beans.

K caseinate from DMV international (Campina).

3.0 METHOD

Soaking, blanching and sterilisation in accordance with the usual methods.

3.1 Jar composition

| Fill weight: | 180–220 gram. |
|---|---|
| Brine or syrup weight: | 145–185 gram. |
| Nett weight: | 365 gram. |

3.2 Brine or syrup composition

Reducing caseinate: shown in table.

| Brine/syrup per liter | Caseinate g/l | Ascorbic acid g/l | Appearance of mixed brine/syrup | pH of brine/syrup |
|---|---|---|---|---|
| 1 | 5.0 | 1.0 | very smooth | 5.09 |
| 2 | 2.5 | 2.0 | very smooth | 4.85 |
| 3 | 1.0 | 1.0 | grainy | 4.56 |
| 4 | 0.5 | 1.0 | somewhat grainy | 4.45 |

3.2 In table the amounts of caseinate/ascorbic acid per liter and the pH of the final brine/syrup.

Remarks with respect to the table.

In the 'appearance of mixed brine/syrup' column it can be seen that brines/syrups 2 and 3 again produce a grainy appearance. The smaller amount of caseinate flocculates out in the medium, which is too acid.

3.3 Brine/syrup with reducing amounts of ascorbic acid, pH of the brine/syrup and appearance of mixed brine/syrup shown in table.

| Brine/syrup per liter | Ascorbic acid g/l | Caseinate g/l | Appearance of mixed brine/syrup | pH of brine/syrup |
|---|---|---|---|---|
| 5 | 0.75 | 5.0 | smooth | 5.38 |
| 6 | 0.50 | 5.0 | smooth | 6.10 |
| 7 | 0.25 | 5.0 | smooth | 6.73 |

Reducing amounts of ascorbic acid, appearance and pH of the brine/syrup in Table 3.3.

3.4 Organoleptic inspection

4.0 RESULTS.

4.1 Soaking and blanching results.

Dry 3250 gram

Soaking 6553 gram=101.63%

Blanching 7342 gram=125.90%

4.2 Visual assessment after sterilisation.

| Brine/syrup with addition of caseinate/ascorbic acid | Clarity of the brine/syrup | Precipitation in the brine/syrup | Turbidity |
|---|---|---|---|
| 5.0/1.0 | +++ | ++ | – |
| 2.5/1.0 | ++ | (+) | ++ |
| 1.0/1.0 | +++ | (+) | (+) |
| 0.5/1.0 | +++ | (+) | (+) |
| 5.0/0.75 | ++ | + | – |
| 5.0/0.50 | ++ | (+) | – |
| 5.0/0.25 | +(+) | – | |

Visual assessment after sterilisation in Table 4.2.

4.4 Organoleptic inspection The inspection was carried out by a small number of inspectors. The beans were too soft and had a floury taste.

5.0 CONCLUSIONS

The caseinate gives a clear brine/syrup

Dissolution of the caseinate is dependent on the amount of ascorbic acid added (added later).

If the pH is too acid, the brine/syrup containing caseinate becomes grainy.

The dosage of ascorbic acid which can be used, with the same results, is 0.75 g per liter brine/syrup (the same clarity).

EXAMPLE 3

1. INTRODUCTION

An alternative brine/syrup for kidney beans has been developed to replace EDTA. In this alternative brine/syrup potassium caseinate (roller-dried, DMV Campina, no. 41540) and ascorbic acid are added. K caseinate is a lactoprotein. Proteins are able to enter into bonds with tannins. These tannins, together with iron and oxygen, produce black discolouration. In principle, black discolouration can no longer occur if the tannins are lacking because they are bound to proteins.

2. EXPERIMENTAL SET-UP

The experiment was carried out using the following combinations of caseinate and ascorbic acid in the brine/syrup:

TABLE 1

Amounts of K caseinate and ascorbic acid added

| Brine/syrup number | K caseinate added g/l | Ascorbic acid added g/l |
|---|---|---|
| 1 | 2.5 | 1.0 |
| 2 | 5.0 | 1.0 |
| 3 | 2.5 | 3.5 |
| 4 | 5.0 | 3.5 |

Table 1 Amounts of K caseinate and ascorbic acid added

In addition to the abovementioned amounts of K caseinate and ascorbic acid, the standard ingredients in accordance with the customary methods were added to every brine/syrup. Two standard brine/syrup samples were prepared:

Standard 1 (S1): standard ingredients without EDTA

Standard 2 (S2): standard ingredients with standard amount of EDTA

The samples containing brine/syrup S1 should show black discolouration and the samples containing brine/syrup S2 should show no black discolouration. The colours of the samples containing alternative brine/syrup are to be compared with these standard samples after sterilisation.

Soaking and blanching of the beans, filling of the jars and sterilisation were carried out in accordance with the customary methods.

3. RESULTS

The following was visible immediately after sterilisation:

TABLE 2

Visual assessment of the jars after sterilisation

| Brine/syrup number | Colour | Clarity of brine/syrup |
|---|---|---|
| S1 (without EDTA) | dark brown | turbid |
| S2 (with EDTA) | normal brown | turbid |
| 1 | normal brown | clear |
| 2 | normal brown | clear |
| 3 | pale brown | clear |
| 4 | pale brown | clear |

Table 2 Visual assessment of the jars after sterilisation

Samples S2, 1 and 2 show a normal brown colour. Samples 1 and 2 have a clearer brine/syrup, as a result of which the colour appears to be somewhat warmer because the beans are more clearly visible.

The samples showed the same relative colour and clarity ratios as in the table above for a prolonged period after sterilisation.

Caseinate also has a clarifying effect on the brine/syrup. It is not clear what produces this beneficial effect.

There is little or no difference in colour to be seen between the brines/syrups containing 2.5 g and 5.0 g caseinate and the same amount of ascorbic acid (brine/syrup 1 compared with brine/syrup 2 and brine/syrup 3 compared with brine/syrup 4).

When more caseinate is added it should also be possible to bind more tannins. This should have a beneficial effect on the colour (less black discolouration). However, this is not seen from the results. It is possible that all tannins are already bound by 2.5 g caseinate/l which means that the addition of more caseinate has no further point.

The difference in the amounts of ascorbic acid added, however, is clear. The colour of samples 3 and 4 clearly differs from that of samples 1 and 2 which contain the same amount of caseinate. Ascorbic acid has a bleaching action.

4. CONCLUSIONS

It has been found from this experiment that potassium caseinate in combination with ascorbic acid would be a good alternative for EDTA. The colour of the samples in which 1.0 g ascorbic acid/l (brines/syrups 1 and 2) was used is fairly close to the colour of the standard sample in which EDTA was used. No black discolouration and/or top discolouration has occurred.

The greater the amount of ascorbic acid added, the lighter becomes the colour of beans and brine/syrup.

Use of caseinate gives a brine/syrup which is clearer than is normally the case.

EXAMPLE 4

ADDITION OF VARIOUS CASEINATE SALTS TO THE BRINE/SYRUP FOR CAPERS

1.0 INTRODUCTION

The addition of caseinate to the brine/syrup has had beneficial consequences in respect of black discolouration and clarity in the case of dark red kidney beans and kidney beans. As a supplementary experiment, an experiment was carried out to determine the effect of different caseinate salts and additions of ascorbic acid on capers.

2.0 MATERIALS

Three types of caseinate salts were used in this experiment:

K caseinate

Ca caseinate

Na caseinate

3.0 METHOD

Soaking, blanching and sterilisation in accordance with customary methods.

| Fill weight: | 180–220 gram. |
|---|---|
| Brine or syrup weight: | 145–185 gram. |
| Nett weight: | 365 gram. |

3.2 Brine or syrup composition

Experiment 1: Use of different caseinate salts

| Brine/syrup | Ingredients (g/l) in addition to 15 g salt |
|---|---|
| 1 standard | 0.65 g EDTA |
| 2 | 5 g K caseinate |
| 3 | 10 g K caseinate |
| 4 | 5 g Ca caseinate |
| 5 | 10 g Ca caseinate |
| 6 | 5 g Na caseinate |
| 7 | 10 g Na caseinate |

Table 3.1 Ingredients added to brine/syrup for Experiment 1.

Experiment 2: Different caseinate salts and L-ascorbic acid dosages

| Brine/syrup | Ingredients (g/l) in addition to 15 g salt |
|---|---|
| 1 | 5 g K caseinate, 0.5 g ascorbic acid |
| 2 | 5 g K caseinate, 1.0 g ascorbic acid |
| 3 | 5 g K caseinate, 1.5 g ascorbic acid |
| 4 | 5 g K caseinate, 1.75 g ascorbic acid |
| 5 | 5 g Na caseinate, 0.5 g ascorbic acid |
| 6 | 5 g Na caseinate, 1.0 g ascorbic acid |
| 7 | 5 g Na caseinate, 1.5 g ascorbic acid |

Table 3.2 Ingredients added to brine/syrup for Experiment 2.

3.3 Dissolution of caseinates and L-ascorbic acid:

The solutions were prepared as follows:

A concentrated solution of 5% caseinate was prepared using the Ultra Turrax:

15 g of salt and the amount of ascorbic acid were dissolved in 900 ml:

100 ml of concentrated caseinate solution were added to the above 900 ml.

4.0 RESULTS 4.1 EXPERIMENT 1: Use of different caseinate salts.

The appearance of the samples was assessed immediately after sterilisation. The samples containing caseinate have an appearance very different to that of the standard. The samples are much darker in colour, but the brine/syrup is much clearer. The capers are very clearly visible. Especially at the top of the jar it can be seen that the brine/syrup is too dark in colour. The samples containing Na caseinate are somewhat clearer and have a somewhat browner colour compared with the samples containing K caseinate and Ca caseinate.

4.2 EXPERIMENT 2: Different caseinate salts and L-ascorbic acid dosages.

The following was visible immediately after sterilisation:

| K caseinate | Colour | Clarity |
| --- | --- | --- |
| S: no ascorbic acid | dark | clear |
| 1: 0.5 g ascorbic acid | lighter than S | as clear as S |
| 2: 1.0 g ascorbic acid | lighter than S as light as 1 | less clear than S and 1 |
| 3: 1.5 g ascorbic acid | lighter than S as light as 1 and 2 | even less clear than 2 |
| 4: 1.75 g ascorbic acid | lighter than S as light as 1, 2, and 3 | even less clear than 2, as clear as 3 |

The same relationships can be seen in the case of Na caseinate. In this case as well, Na caseinate gives a somewhat better colour than K caseinate.

5.0 CONCLUSIONS 5.1 Experiment 1: Use of different caseinate salts. The brine/syrup is appreciably clearer when caseinate is used. The colour has to be optimised by adding ascorbic acid. There is no difference between the samples containing 5 or 10 g of added caseinate per liter.

5.2 EXAMPLE 2: Different caseinate salts and L-ascorbic acid dosages.

On the basis of the results which were visible immediately after sterilisation:

Addition of ascorbic acid gives a lighter colour but the addition of additional ascorbic acid in excess of 1 g does not produce an even lighter colour.

The clarity of the brine/syrup decreases when more ascorbic acid is added. This is even the case for the brines/syrups with which no flocculation of caseinate has taken place beforehand.

Na caseinate with 0.5 g ascorbic acid has the best colour and clarity.

We claim:

1. Method for the production of an optionally preserved, water- and/or oil-containing foodstuff selected from the group consisting of vegetables, pulses and fruit, consisting of the steps of adding a casein compound which is soluble in water and/or oil or has been dissolved in water and/or oil to the foodstuff in which the casein compound is used in an amount of less than 20 g per 1000 g of foodstuff including water and/or oil containing brine or syrup, and also adding ascorbic acid and/or ascorbate or another reducing agent selected from the group consisting of sulphurous acid and the salts thereof and the following (organic) acids (which bind divalently or polyvalently charged metal ions): adipic acid, DL-malic acid, succinic acid, citric acid, acetic acid, fumaric acid, D-glucuronic acid, L-lactic acid, L-tartaric acid, phosphoric acid and galacturonic acid, mixtures thereof and low-molecular polymerised compounds which have the above-mentioned acids as based components and in which free carboxyl groups remain on the chain after polymerisation, to the foodstuff including water, oil or a mixture thereof.

2. Method according to claim 1, wherein the casein compound used is sodium caseinate, potassium caseinate, calcium caseinate or magnesium caseinate.

3. A method of improving the appearance and/or brine or syrup of water- and/or oil-containing products, selected from the group consisting of vegetables, pulses and fruit, in which the casein compound of claim 2 is added to said products in an amount of less than 20 g per 1000 g of foodstuff including water and/or oil containing brine or syrup.

4. Method according to claim 1, wherein 0.01–150 g of casein compound is used per liter of water, oil or mixture thereof.

5. Method according to claim 1, wherein the ascorbic acid and/or ascorbate or another reducing agent is added in an amount of 0.01–10 g per liter of water, oil or mixture thereof.

6. Method according to claim 1, wherein the casein compownd is a caseinate and the pH of the preserved foodstuff is between 3.5 and 7.

7. Closed container, containing a foodstuff which has been prepared in accordance with the method of claim 1.

8. Method according to claim 1 wherein the pH of the preserved food stuff is between 5 and 6.

* * * * *